(12) United States Patent
Roberge et al.

(10) Patent No.: US 12,295,349 B2
(45) Date of Patent: May 13, 2025

(54) SYSTEM AND METHOD FOR MONITORING, IDENTIFYING AND RECORDING BEEHIVE STATUS

(71) Applicant: Technologies Nectar Inc., Montreal (CA)

(72) Inventors: Marc-Andre Roberge, Montreal (CA); Evan Henry, Montreal (CA); Bastien Laurent, Montreal (CA); Ugo Pellerin, Montreal (CA); Xavier de Briey, Montreal (CA); Jean-Samuel Chenard, Saint-Bruno-de-Montarville (CA)

(73) Assignee: TECHNOLOGIES NECTAR INC., Montreal (CA)

( * ) Notice: Subject to any disclaimer, the term of this patent is extended or adjusted under 35 U.S.C. 154(b) by 0 days.

(21) Appl. No.: 18/256,770

(22) PCT Filed: Dec. 10, 2021

(86) PCT No.: PCT/CA2021/051784
§ 371 (c)(1),
(2) Date: Jun. 9, 2023

(87) PCT Pub. No.: WO2022/120496
PCT Pub. Date: Jun. 16, 2022

(65) Prior Publication Data
US 2024/0016127 A1 Jan. 18, 2024

Related U.S. Application Data

(60) Provisional application No. 63/124,486, filed on Dec. 11, 2020.

(51) Int. Cl.
*A01K 47/00* (2006.01)
*A01K 11/00* (2006.01)
*A01K 29/00* (2006.01)

(52) U.S. Cl.
CPC .......... *A01K 29/005* (2013.01); *A01K 11/006* (2013.01); *A01K 47/00* (2013.01)

(58) Field of Classification Search
CPC .............................. A01K 47/06; A01K 29/005
See application file for complete search history.

(56) References Cited

U.S. PATENT DOCUMENTS

| | | | |
|---|---|---|---|
| 7,549,907 | B2 | 6/2009 | Bromenshenk et al. |
| 9,894,887 | B2 | 2/2018 | Collins |

(Continued)

FOREIGN PATENT DOCUMENTS

| | | |
|---|---|---|
| AU | 2015101097 A4 | 9/2015 |
| AU | 2019204596 A1 | 1/2020 |

(Continued)

OTHER PUBLICATIONS

International Search Report dated Jan. 21, 2022 from the corresponding International Patent Application No. PCT/CA2021/051784.

*Primary Examiner* — Joshua J Michener
*Assistant Examiner* — Henry Hooper Mudd
(74) *Attorney, Agent, or Firm* — Brouillette Legal Inc.; Philippe Brouillette

(57) ABSTRACT

The system classifies aspects of beehive phenomenon by fusing sensor data from inside a beehive and human collected data from the same beehive using machine learning algorithms. The human collected data labels the sensor data indicating various aspects of beehive states. By collecting observation data from people looking into the beehives equipped with sensors, the sensor data is augmented with information. The resulting sensor and labelled dataset are used to train machine learning algorithms to classify beehive health states using sensor data alone. This system is used for remote monitoring of honeybee hives using in-hive sensors.

31 Claims, 5 Drawing Sheets

(56) References Cited

U.S. PATENT DOCUMENTS

| | | | |
|---|---|---|---|
| 10,064,395 | B2 | 9/2018 | Chapa |
| 2010/0062683 | A1 | 3/2010 | Brundage |
| 2015/0084784 | A1* | 3/2015 | Suta ................... A01K 47/06 |
| 2015/0366169 | A1 | 12/2015 | Jiang et al. |
| 2017/0360010 | A1 | 12/2017 | Wilson-Rich |
| 2020/0334443 | A1* | 10/2020 | Symes ................. G06K 9/00 |
| 2021/0307301 | A1* | 10/2021 | Zmyslony ............ A01K 47/06 |
| 2022/0304284 | A1* | 9/2022 | Samanci .............. A01K 47/06 |

FOREIGN PATENT DOCUMENTS

| | | |
|---|---|---|
| CN | 203120697 U | 8/2013 |
| CN | 206933011 U | 1/2018 |
| CN | 207400178 U | 5/2018 |
| CN | 108594678 A | 9/2018 |
| CN | 109145032 A | 1/2019 |
| CN | 109169410 A | 1/2019 |
| FR | 2868250 A1 | 10/2005 |
| WO | 2018184014 A1 | 10/2018 |

* cited by examiner

SYSTEM AND METHOD FOR MONITORING, IDENTIFYING AND RECORDING BEEHIVE STATUS

CROSS-REFERENCE TO RELATED APPLICATIONS

The present patent application claims the benefits of priority of U.S. Provisional Patent Application No. 63/124,486, entitled "SYSTEM AND METHOD FOR MONITORING, IDENTIFYING AND RECORDING BEEHIVE STATUS", and filed at the United States Patent and Trademark Office on Dec. 11, 2020, the content of which is incorporated herein by reference.

FIELD OF THE INVENTION

The present invention generally relates to methods and systems for monitoring beehives, and more particularly, to methods and systems for automatically monitoring, identifying, and recording the status of beehives.

BACKGROUND OF THE INVENTION

Bees are particularly important pollinators. From wild plants to vegetables to fruits and nuts, a shortage of pollinators would have serious implications for both human food security and the environment. Unfortunately, species richness or the number of bee species has declined by up to 60% in certain areas due to pests and pathogens, exposure to agrochemicals and habitat loss and degradation.

In an attempt to maintain suitable bee population health, various methods of monitoring general health of beehives have been developed. For example, U.S. Pat. No. 9,894,887 discloses a remote beehive monitoring system comprising a sensor for detecting feed stored within a container as well as other environmental data which are communicated to a user.

U.S. Pat. No. 7,549,907 discloses a beehive comprising an acoustic sensor for detecting acoustics produced by honeybees. The acoustic signal is filtered, summarized, and analyzed to form an acoustic fingerprint which is compared to known patterns emitted by the honeybees when exposed to sub-lethal concentrations of airborne toxicants.

U.S. Patent Publication No. 2017/0360010 discloses a processing system including sensors for monitoring beehives as well as control elements for manipulating conditions within the beehive. The system is additionally configured to make predictive decisions based on machine learning techniques when evaluating the data.

Chinese Patent Publication No. 108594678 discloses a solar powered beehive monitoring device for the automatic collection of beehive temperature, humidity, sound, weight and honeybee discrepancy multidimensional data such as situation and geographical position information which are then uploaded to a remote server. The remote server subsequently performs real-time diagnosis of the beehive using artificial neural networks.

Finally, Chinese Patent Publication No. 109169410 discloses a beehive comprising a data acquisition device, control device and environment regulating device and configured to compare measured environmental parameters with predetermined data models in order to adjust the conditions within the beehive. The system further uses machine learning acquisition to obtain more accurate honeybee health situations.

However, these solutions do not offer a simplified method of associating recorded data to a particular beehive. There is therefore a need for a system capable of automatically associating recorded general health data to a specific beehive.

SUMMARY OF THE INVENTION

The aforesaid and other objectives of the present invention are realized by generally providing a system configured to fuse sensor data from inside a beehive and human collected data from the same beehive using machine learning algorithms. The human collected data labels the sensor data indicating various aspects of beehive states. By collecting observation data from people looking into the beehives equipped with sensors, the sensor data is augmented with information. The resulting sensor and labelled dataset are used to train machine learning algorithms to classify beehive health states using sensor data alone. This system is used for remote monitoring of honeybee hives using in-hive sensors.

The present invention is further realized by a system for remote monitoring a health state of beehives. The system comprises an identification tag associated with one of the beehives, a sensor device within a predetermined radius of the beehive, the sensor device being configured to measure properties within the beehive associated with the identification tag, and automatically pair the measured property data with the identification tag, a computerized device in communication with the sensor device, the computerized device being configured to receive the measured property data paired to the identification tag, identifying the health state of the beehives based on the received property data.

According to one aspect of the invention, the sensor device may comprise a long reach antenna in wireless communication with the computerized device, wherein the long reach antenna may operate at frequencies under 1 GHz. The sensor may further comprise a scanning module configured to scan the identification tag. The sensor may similarly comprise a geolocalization module, the sensor device being configured to activate the scanning module when the geolocalization module detects a change of position the sensor device, or an accelerometer, the sensor being configured to activate the scanning module when the accelerometer a movement of the sensor device.

According to another aspect of the invention, the sensor device may be further configured to automatically repair with another identification tag when the sensor device is repositioned within a predetermined radius of another beehive and the sensor may further comprise a routing system being in wireless communication with the sensor device, the routing system comprising a storage medium configured to store at least one of the measured property data and the observational data. The routing system may be configured to process the measured property data by performing one of compressing, aggregating, and filtering on said measured property data.

According to yet another aspect of the invention, the system may further comprise a mobile device of a user in data communication with the sensor device, the mobile device being configured to store and transfer the measured property data the computerized device. The system may further comprise a mobile device configured to associate the sensor to the identification tag and the identification tag may comprise at least one of an NFC tag, a QR Code and a serial number. Moreover, the measured property data may be associated to a timestamp. Moreover, the system may further comprise a mobile computerized device of a user adapted to store user generated observational data, the observational data being associated with the at least one beehive associated with said identification tag, wherein the observational data comprise timestamps associated thereto.

The present invention may further be realized by a method for remotely monitoring a health state of beehives, the method comprising associating a sensor device to an identification tag associated one of the beehives, the sensor device being within a close range of the beehive, capturing data related to the health state of the beehive using the sensor device, pairing the captured data to the identification tag, transferring the paired data to a remote computerized device, and identifying the health state of the beehive based on the received paired data.

According to one aspect of the invention, the method may further comprise detecting a geolocalization position of the sensor device, and pairing the geolocalization position of the sensor device to captured data of the beehive. The method may further comprise routing the captured data to the computerized device through an intermediate system in data communication with the sensor device and within a predetermined radius of the sensor device. Moreover, associating the sensor data with the identification tag may comprise scanning the identification tag, detecting a displacement of the sensor and/or detecting movement of the sensor.

According to another aspect of the invention, the method may further comprise associating timestamps to the captured data, recording user generated observational data related to the at least one beehive associated with said identification tag, the user associating the user generated observational data to the identification tag, and transferring the associated user generated observational data to the computerized device. The method may also comprise training machine learning algorithms to classify the beehive health states using the paired sensor data and/or to classify the beehive health states using the paired sensor data. The method may further comprise using the trained machine learning algorithms to identify health state of the beehive and the method may comprise calculating estimates based on the paired data and the observational data inputted by the user being used to validate the calculated estimates. Finally, the method may further comprise identifying if calculated estimates are valid or invalid.

The present invention may also be realized by a method for training an artificial intelligence machine learning algorithm to classify health states of beehives, the method comprising capturing and recording various properties relating to wellbeing of the beehives using sensor devices, associating the captured properties with one or more beehives and with a timestamp, recording user generated observations into one or more mobile devices, associating the user generated observations with one or more beehives and with a timestamp, and training the machine learning algorithms to classify the health states of the beehives using the various properties captured by the sensor devices for the one or more beehives.

According to one aspect of the invention, the method may further comprise identifying unclassified events or behaviors within one or more beehives using the observational data and training the machine learning algorithms using the new unclassified events and the time associated properties captured by the sensor device. The recording of the user generated observations may comprise scanning an identification tag of the beehive or inputting an identification number of the identification tag into the mobile device. Finally, the method may further comprise detecting a position of the mobile device, identifying surrounding beehives based on the detected position, and associating the inputted observational data to the identified surrounding beehives.

Even if the present application refers to honeybees and beehives, the present systems and methods may be used with any other type of bees, pollinating insects, or colony of nesting insects. Thus, the present systems and methods may be used with other types of nesting and/or shelter habitats for insects, such as man-made insect habitats.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

Figure 1:
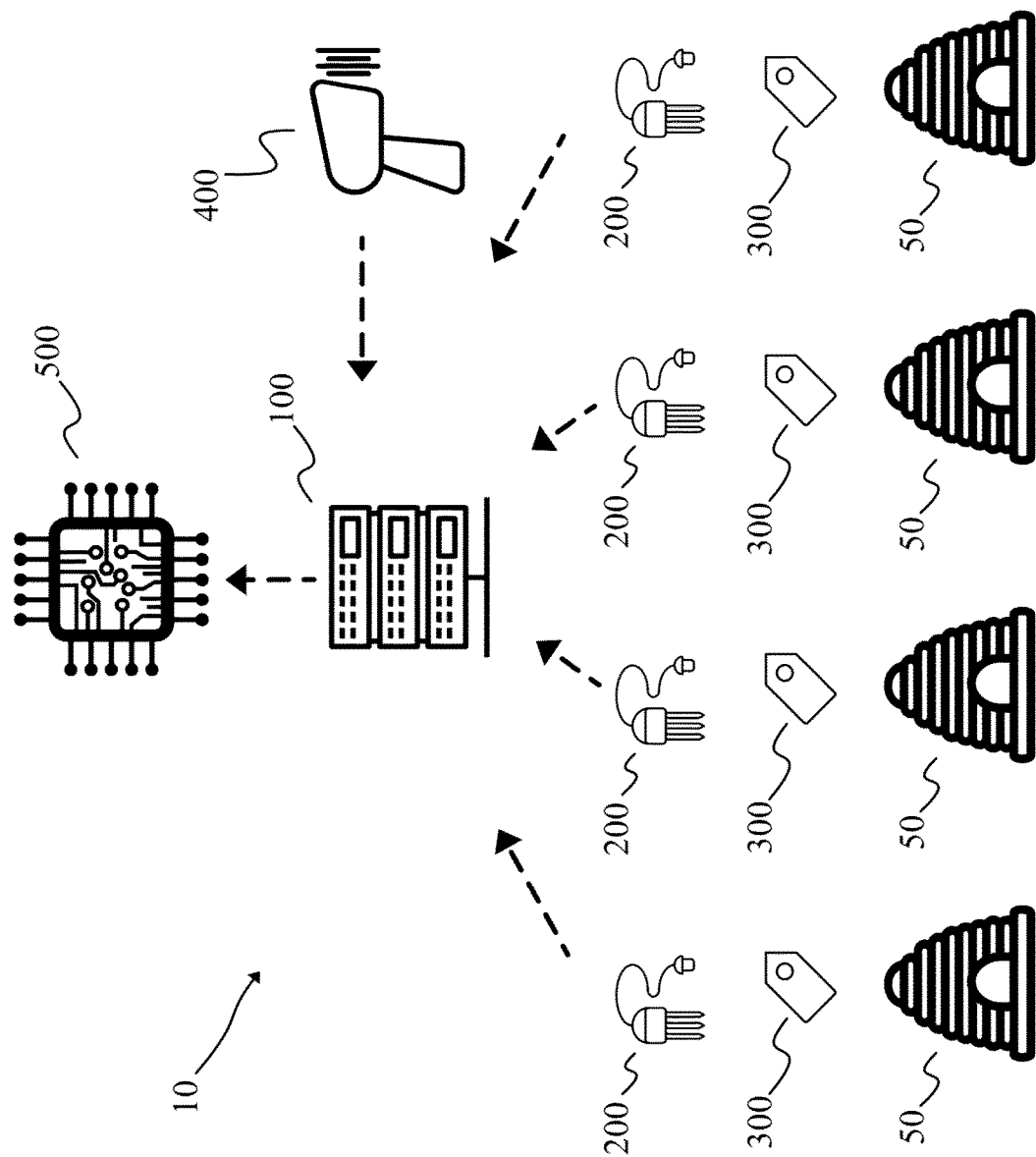
FIG. 1 is an illustration of an exemplary system for monitoring and recording beehive status in accordance with the principles of the present invention.

A novel system and method for monitoring, identifying, and recording beehive status will be described hereinafter. Although the invention is described in terms of specific illustrative embodiments, it is to be understood that the embodiments described herein are by way of example only and that the scope of the invention is not intended to be limited thereby.

The systems and methods described herein incorporate computer systems, identification systems and sensors, all of which contribute to a means for ensuring the wellbeing and positive health of one or more beehives 50. Broadly and referring to FIG. 1, a precision beekeeping platform 10 comprises a database system 100, at least one sensor device 200 for measuring various properties of a beehive 50, one or more identification tags 300 for identifying the one or more beehives 50 and a server 500. In some embodiments, the system 10 may further comprise one or more mobile devices 400.

In yet other embodiments, the system 10 may comprise application programming interfaces (API) (not shown) configured to receive the data from the mobile devices 400, from the sensor device 200 or from a hub of sensor devices to communicate such data to the data source 100 and/or to the server 500. The API or other interfacing method generally acts as communication layer to abstract the transfer of data to the server 500 or to the database 100.

The precision beekeeping platform 10 may be adapted to function with various forms of beehives 50 including, but not limited to, Langstroth hives, Top-bar hives, Wane hives or any other hive suitable for the production of honey, pollination of nearby crops or apitherapy treatment.

Figure 2:
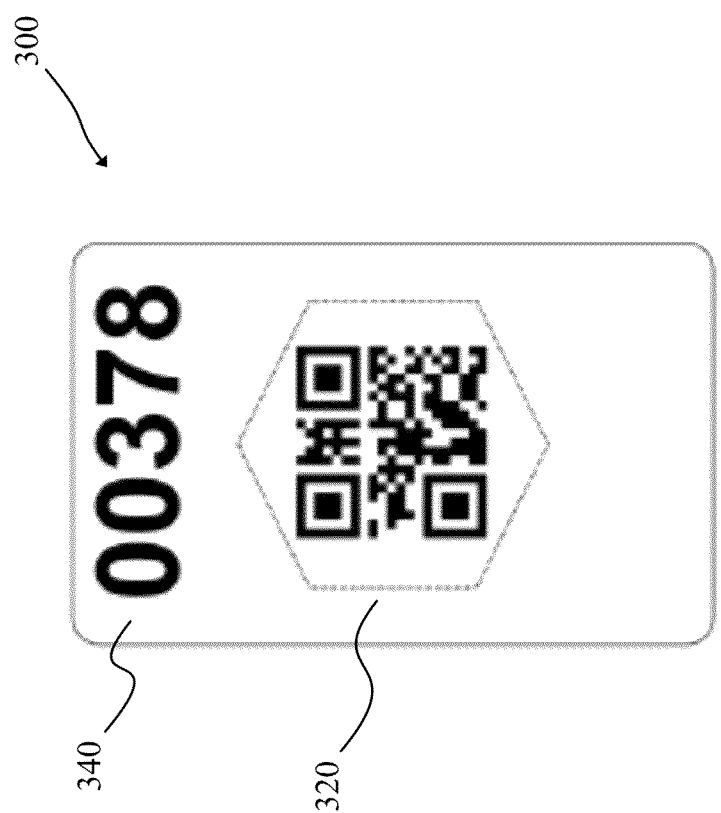
FIG. 2 is an illustration of an exemplary identification tag in accordance with the principles of the present invention.

Referring to FIGS. 1 and 2, a system for identifying data associated to a beehive is provided. The system generally comprises identification tags 300 to identify individual beehives 50. The system further comprises at least one sensor device 200 within the beehive. Broadly, the system uses the sensors and the identification tag 300 to associate specific data of a specific sensor 200 to a specific beehive 50. To that end, each beehive 50 may be associated to a unique identification tag 300. The identification tag 300 may take the form of a card, a sticker, or any other suitable form. In other embodiments, the identification tag 300 may be printed directly onto the beehives 50.

The identification tags 300 may comprise various means of identification such as an RFID tag, a bar code, a QR code, a machine-readable code, a human readable code, or any suitable combination thereof. The RFID tag may be battery-operated or passive (such as an NFC tag). Similarly, the human readable code may be formed of any suitable combination of alphanumeric characters and/or symbols.

For example, in the embodiment illustrated in FIG. 2, the identification tag 300 comprises an NFC tag (not shown), a machine-readable QR code 320 and a serial number 340. Accordingly, each identification method of the identification tag 300 may be read by a different reader such a scanner, sensor, or a human caretaker.

Still referring to FIG. 1, the sensor device 200 may comprise an electronic device configured to measure and record various properties of the beehives 50 for identifying their wellbeing. These properties may include the temperature, the humidity, sound, vibration, or any other relevant environmental data. The sensor device 200 may further comprise an orientation detection device or means configured to detect and/or measure the orientation of the sensor device 200, such as but not limited to a gyroscope. The orientation detection device may be used to indicate if the sensor device 200 may has been displaced or dislodged within the beehive 50 thereby affecting the readings of the properties within the beehive 50. The orientation detection device may additionally be used to indicate that the beehive 50 has been displaced or overturned and therefore is in need of assistance.

Accordingly, the sensor device 200 may comprise a multitude of distinct sensors configured to measure each of the aforementioned properties within an internal or external environment of the beehive 50. The sensor device 200 may further be powered by an internal battery, a direct power line, a solar panel, or any suitable external power source such as solar or wind power. The sensor device 200 may additionally associate a digital record of the time of occurrence or timestamp to the measurements or readings of the recorded properties.

Each of the beehives 50 may be associated to a sensor device 200. Accordingly, the sensor device 200 may be affixed to the beehive 50 such as to be semi-permanently or permanently installed onto the beehive 50 for extended periods of time.

In other embodiments, the sensor device 200 may be detachably affixed to the beehive 50 thereby allowing the sensor device 200 to be moved between different beehives 50 in accordance with the needs of the precision beekeeping platform 10. Mobile or non-permanent sensor devices 200 may further be easily replaced with another sensor device 200 within a beehive 50 due to maintenance or technical problems. In some embodiments, a sensor device 200 may be moved between a number of beehives 50 to allow intermittent monitoring using a smaller number of sensor devices 200 based on the necessity for monitoring (such as on a scheduled interval or when an issue is suspected).

In still other embodiments, identification tags 300 having the same identifier may be associated to a plurality of beehives 50 forming a group with each beehive having a sensor device 200. Alternatively, a single identification tag 300 may be associated with a plurality of beehives 50 with each beehive 50 comprising a sensor device 200 being paired with the identification tag 300 of the plurality of beehives 50. Such paired sensor devices 200 thus form a group of beehives 50. When transmitting data, each of the paired sensor devices 200 labels or tags the transmitted data with the ID or identifier of the identification tag 300 and a timestamp. Thus, the data captured in each of the paired beehives 50 is associated to the group of beehives 50. As an example, multiple beehives 50 may be joined together or stacked onto pallets for transport, more particularly in commercial beekeeping.

In other embodiments, an identification tag 300 may be associated to a grouping of beehives 50 and a single sensor device 200 may be configured to collect environmental data regarding one or more of the beehives 50 of the grouping.

The sensor device 200 may comprise a processor running an operating system and a storage medium. In some embodiments, the processor is a microcontroller unit (MCU). The sensor device 200 may further comprise I/O ports, a networking module typically comprising an antenna, a geolocalization module, such as a GPS chip, or any combination thereof. The sensor device 200 may be configured to perform certain data processing tasks of the various properties measured or recorded by the sensor device 200. Such processing may comprise compressing the data, reducing the data, sampling the sound data, etc. The said data processing tasks are typically performed in the interest of reducing the necessary data transfer bandwidth between the sensor device 200 and other systems of the precision beekeeping platform 10. The reduction of data generally allows reduction of the usage of the networking module, such as the antenna, which are generally power intensive.

The sensor device 200 may additionally comprise one or more additional modules configured to identify the beehives 50. For example, the sensor device 200 may comprise an image recording module and/or an RFID scanner module configured to identify the identification tag 300 of a specific beehive 50 by means of the NFC tag or the QR code 320. Such identification may allow the sensor device 200 to associate the data collected to the identification tag 300 and therefore to its associated beehive 50.

In some embodiments, the sensor device 200 may comprise a scanner or camera configured to scan the identification tag 300. Thus, prior to installing the sensor device 200 in the beehive 50, the scanner of the sensor device 200 may be used to scan the identification tag 300. The sensor device 200 stores the identification value of the tag 300 within a memory device. The sensor device 200 is further configured to add the identification value to the captured data when transmitting the data over the network or to the hub.

In other embodiments, the sensor device 200 may rely on its geolocalization module to identify its location relative to a predetermined database of beehive locations. The sensor device 200 may therefore associate the data collected to a beehive 50 or grouping of beehives 50 know to the precision beekeeping platform 10 as sharing the same location.

In certain embodiments, the sensor device 200 comprises an accelerometer or other means adapted to detect movement of the sensor device 200. In a typical embodiment, the sensor device 200 may disable a pairing mode when the accelerometer does not detect any movement. When the accelerometer detects some movements or a predetermined series of movement, such as but not limited to shacking the sensor device 200, the sensor device 200 may activate the pairing mode. The sensor device 200 may be configured to activate the pairing mode for a predetermined period. When the pairing mode is enabled, the sensor device 200 is configured to detect the identification tag 300, such as activating the antenna to detect a close-by RFID or activating a camera module to scan the QR code 320. As such, detected motion of the sensor device 200 thereby indicates a potential new identification tag 300, thus suggesting the sensor device 200 having been moved in another beehive 50.

In other embodiments, the detection of the motion of the sensor device 200 may trigger any other actions, such as but not limited to, activating the network module to transmit data that was stored on the sensor device 200 or resetting the sensor device 200.

In certain embodiments, the sensor device 200 may be configured not to detect the identification tag 300 configured to identify the beehives 50. Accordingly, the precision beekeeping platform 10 may associate a sensor device 200 to a corresponding beehive 50 by other means. For example, the sensor device 200 may comprise a unique identifier code similar to the serial number 340 of the identification tag 300. The precision beekeeping platform 10 may therefore be configured to receive the unique identifier code of the sensor device 200 and to identify the identification tag 300 of the beehive 50 associated to the sensor device 200 using any of the aforementioned identification means. The unique identifier code of the sensor device 200 may by identified or inputted using, for example, the database system 100, the one or more mobile devices 400 or any other suitable system connected to the precision beekeeping platform 10. In other embodiments still, the unique identifier code of the sensor device 200 may consist of software identified by, for example, the database system 100, the one or more mobile devices 400 or any other suitable system in wireless or wired communication with the sensor devices 200.

In some embodiments, a mobile device 400 is configured to execute a software or an application. The software is configured to allow a user to manually input an identification value of a beehive 50 and to select a sensor 200 to pair to said beehive 50. In such embodiments, the sensor 200 typically comprises an identification value such as a sticker. The user further enters the identification value of the sensor device 200 or select the sensor device 200 from a predefined list of existing sensor devices 200. The software is further configured to send the inputted values to the hub or the server 500 to be stored in an association map. Thus, the server 500, upon reception of data from a paired sensor device 200, shall associate the said received data to the beehive 50 mapped to the said sensor device 200.

In certain embodiments, the precision beekeeping platform 10 may additionally be adapted to complement the data retrieved by the sensor devices 200 with additional data retrieved from additional sensors located outside of the beehives such as, for example, a thermometer, a barometer, a hygrometer, and/or with additional data retrieved from another data source such as, for example, an online database. Similarly, the precision beekeeping platform 10 may be further configured to complement the data retrieved by the sensor devices 200 with data provided by one or more external data sources (not shown) such as, for example, one or more databases comprising weather data, satellite imagery and data, crop maps, chemical applications, land management data, agricultural data, property ownership data, political district data and/or any other relevant data. The precision beekeeping platform 10 may be configured to access the one or more external data sources via any type of network or known communication technologies, such as but not limited to, Internet, WAN and LAN networks, Bluetooth™, Wi-Fi, RF signal, wired communication or any other suitable means.

In further embodiments, the precision beekeeping platform 10 may further be adapted to complement the data retrieved by the sensor devices 200 with observational data generated by various users (such as a caretaker, beekeeper or apiarist). To that end, the precision beekeeping platform 10 may be configured to use data from the one or more mobile devices 400.

The mobile devices 400 may comprise a handheld electronic device having a processor running an operating system, a storage medium, an input device allowing the user to input their observations, an output, a networking module, a geolocalization module or any combination thereof. The mobile devices 400 may therefore be used by a user or accessible by said user and configured to record observational data of the beehives 50 relating to their wellbeing. The mobile devices 400 may additionally associate a digital record of the time of occurrence or timestamp to the measurements or readings of the recorded properties.

Similar to the sensor devices 200, the mobile devices 400 may additionally comprise one or more additional modules configured to identify the beehives 50. For example, the sensor device 400 may comprise an image recording module and/or an RFID scanner module configured to identify the identification tag 300 of a specific beehive 50 by means of the NFC tag or the QR code 320. The mobile devices 400 may additionally be configured to allow manual input of the serial number 340 and/or to select the sensor device 200 or beehives 50 from a list of existing sensor devices 200 or beehives 50.

In other embodiments, the mobile device 400 may comprise a geolocalization module. The mobile device 400 is configured to identify or detect the geolocalization coordinates and to map such geolocalization coordinates to stored beehive locations or sensor device locations. The mobile devices 400 may therefore associate the observational data collected to a beehive 50 or grouping of beehives 50 sharing the same location.

Such identification may allow the mobile devices 400 to associate the observational data associated to the identification tag 300 and its associated one or more beehives 50. For instance, a user may begin by using the mobile device 400 to scan the NFC tag, the QR Code 320, to input the serial number 340, or any combination thereof, prior to recording observations related to the beehive 50 associated to the identification tag 300. The observational data is associated to a timestamp to allow mapping with the captured data of the sensor data 200.

It should be understood that the observational data may be collected or gathered by an individual looking into the beehives or may be results from processed data based on sampled data from the beehives 50, such as but not limited to sampled data processed by a third party or third-party system, such as a laboratory or a test center. Understandably, observational data may be combined to processed data or external analysis based on the data of the beehives. As an example, an individual may take a sample from the beehives 50 and send such samples to an external sites or laboratory which will proceed analysis or tests on the said samples. In such an example, the results may be used as observational data.

Figure 3:
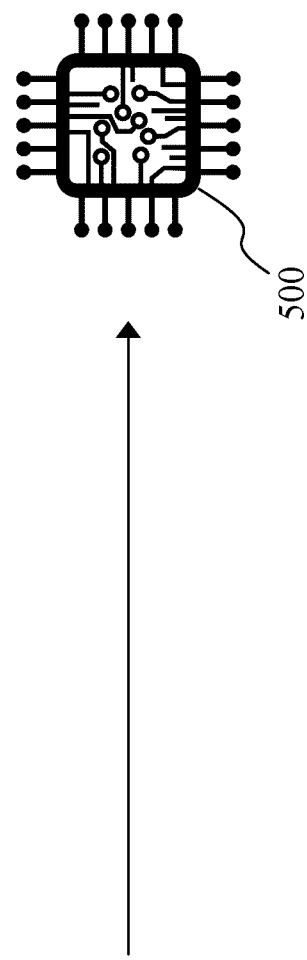
FIG. 3 is an illustration of a first exemplary data flow for monitoring and recording beehive status in accordance with the principles of the present invention.
Figure 3:
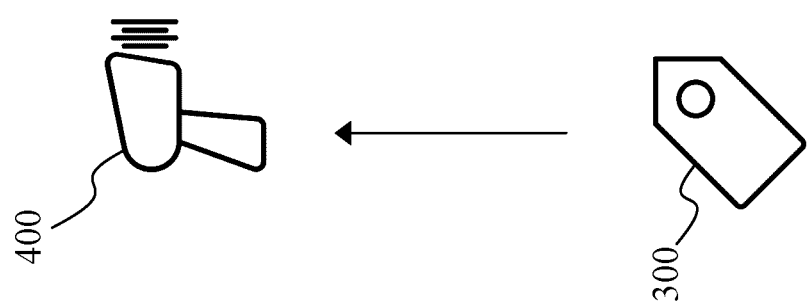
Figure 4:
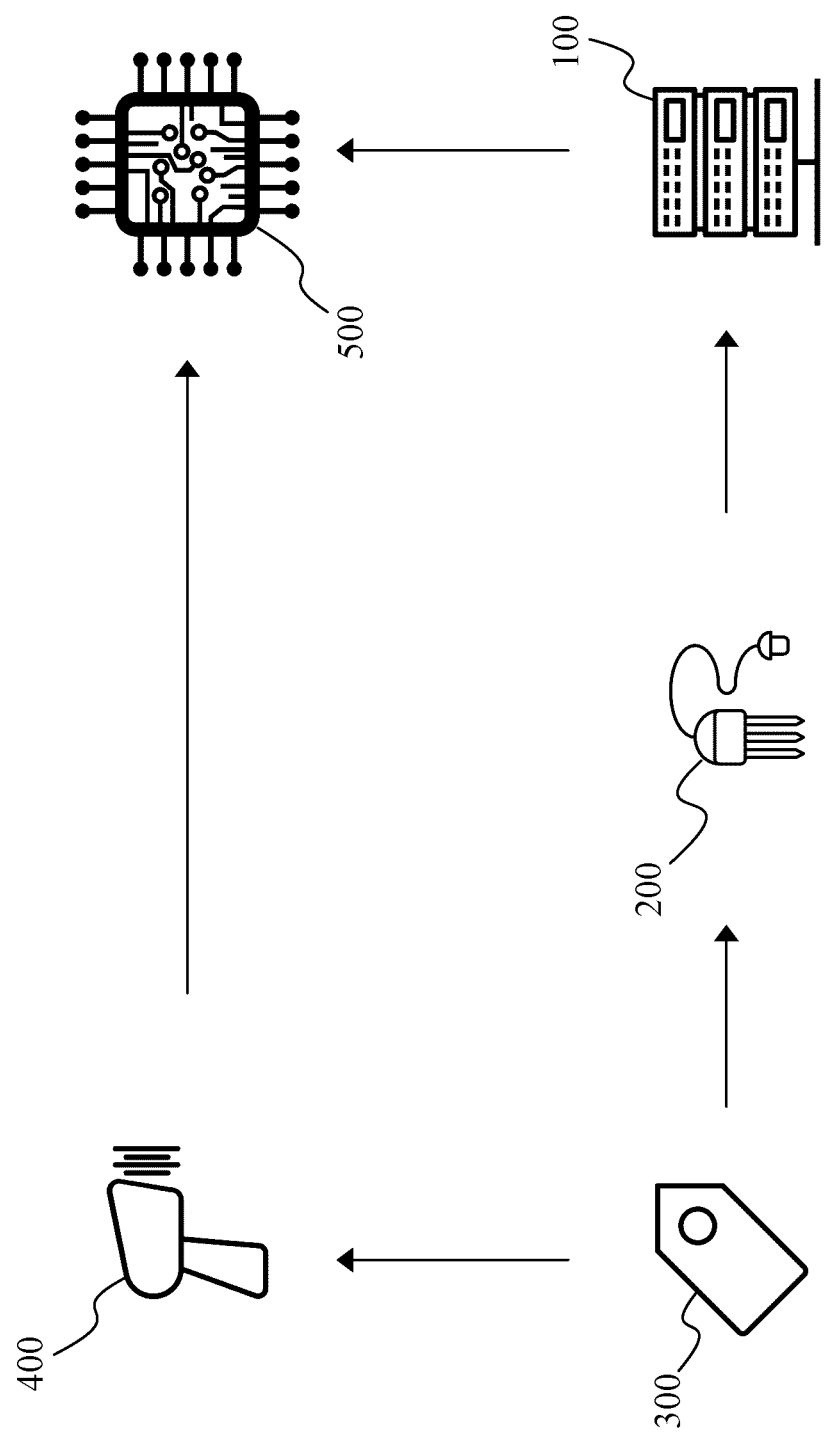
FIG. 4 is an illustration of a second exemplary data flow for monitoring and recording beehive status in accordance with the principles of the present invention.

Referring now to FIGS. 3 and 4, the sensor devices 200 and mobile devices 400 may be configured to transfer recorded sensor data and observational data to the database system 100. In certain embodiments, the mobile devices 400 may be configured to send the observational data directly to the server 500. The transfer may be performed via any type of known data communications, such as but not limited to, Internet, WAN or LAN networks, Bluetooth™ Wi-Fi, RF signal, wired communication or any other suitable means. In embodiments comprising multiple beehives 50 and sensor devices 200, the sensor devices 200 may each be in communication with the database system 100 thereby forming a network. In yet other embodiments, the system 10 may comprise application API configured to receive the observational data from the mobile devices 400 and to communicate such data to the data source 100 or to the server 500.

In other embodiments, the sensor devices 200 and mobile devices 400 may transfer data between themselves as an intermediary step to transfer the data to the database system 100. For example, a sensor device 200 not being in communication with the database 100 may be configured to store the captured data in a memory or data storage. When a mobile device 400 connects to the sensor device, the stored data is transferred to the mobile device 400 for a deferred transfer. In such embodiments, the mobile device 400 may be configured to automatically start transferring the accumulated transferred data when the mobile device 400 is connected to a network, such as but not limited to a mobile network or a Wi-Fi network.

In certain embodiments, the sensor devices 200 may further comprise a long reach antenna adapted to wirelessly communicate with other systems of the precision beekeeping platform 10 through a long-distance wireless protocol. As an example, the sensor device 200 may be configured to maintain use the Simple Link™ Long Range wireless protocol developed by Texas Instruments. As an example, the sensor device 200 may comprise a CC1312R wireless multi-protocol MCU used to communicate using the Simple Link™ Long Range protocol. Long distance wireless protocol typically uses frequencies under 1 GHz. Honey or other organic materials have been known to interfere with some higher frequencies. Thus, honey or organic material produces less interference using such frequencies (under 1 GHz).

In embodiments using long distance wireless protocol, a single routing system 100 may be used for beehives being spread across a large diameter and thus may comprise associating a plurality or group of beehives 50, In some embodiments, the diameter may range from 100 meters to 2 kilometers. Having more beehives 50 per routing system 100 generally aims at lowering maintenance and/or reducing costs associated with monitoring the beehives 50.

The database or routing system 100 may comprise a processor running an operating system, a storage medium, an input device an output or any combination thereof. The routing system 100 typically stores the transferred data in its storage medium. Moreover, in certain embodiments, the routing system 100 may be accessed by a separate device by means of a website, a mobile application, a desktop application or any other application software suitable for interfacing with a computer program.

The routing system 100 may be powered by an internal battery or any suitable external power source. In certain embodiments, the routing system 100 is solar powered.

The routing system 100 may be configured to synchronize the clocks of the different sensor devices 200 in communication with the routing system 100. The routing system 100 may further be configured to store data communicated from the connected sensor devices 200 and to defer the sending of such data to the server 500. In yet other embodiments, the routing system 100 may further be configured to process the data prior to communicating to the server 500, such as compressing, aggregating, or filtering the raw data from the sensor device 200.

In certain embodiments, the routing system 100 may combine the data generated by the sensor devices 200 and the mobile devices 400 according to the identification tag 300 and timestamps associated to each. The routing system 100 may further be configured to send the data stored within its storage medium to the server 500. The routing system 100 may communicate with the server 500 via a cellular connection or any other suitable means. Files transferred between the routing system 100 and the server 500 can be in different text, graphic, audio and video format.

The transfer may be scheduled to be performed automatically according to any desired interval of time or may be performed when prompted by a user. Once the data has been transferred to the server 500, the routing system 100 may erase the data, continue to store the data in its storage medium for future access or a combination thereof.

In a preferred embodiment, the server 500 may be configured to implement supervised, unsupervised or reinforcement machine learning algorithms to further improve the analysis of the data collected by the sensor devices 200. Accordingly, the sensor data may be cross-referenced with the corresponding observational data from the mobile device 400 in order to obtain a greater understanding of the well-being of the beehives 50 by comparing said observational data (considered as the validation dataset) to the estimated wellbeing of the beehives 50. To that end, the server 500 may train machine learning algorithms to classify beehive health states using exclusively sensor data generated by the sensor devices 200. The server 500 having trained algorithms may therefore be used for remote monitoring of beehives 50 using sensor devices 200.

In some embodiments, the server 500 is configured to calculate estimates based on the sensor data. The observational data inputted by the user are used to validate such estimates, such as identifying if calculated estimates were valid or invalid. Otherwise, in some other embodiments, the observational data may comprise previously undetected events or behaviors of the bees within the beehives 50. In such events, the server may be trained to detect such new events or behaviors based on the sensor data captured at the time of the observational data are inputted.

Figure 5:
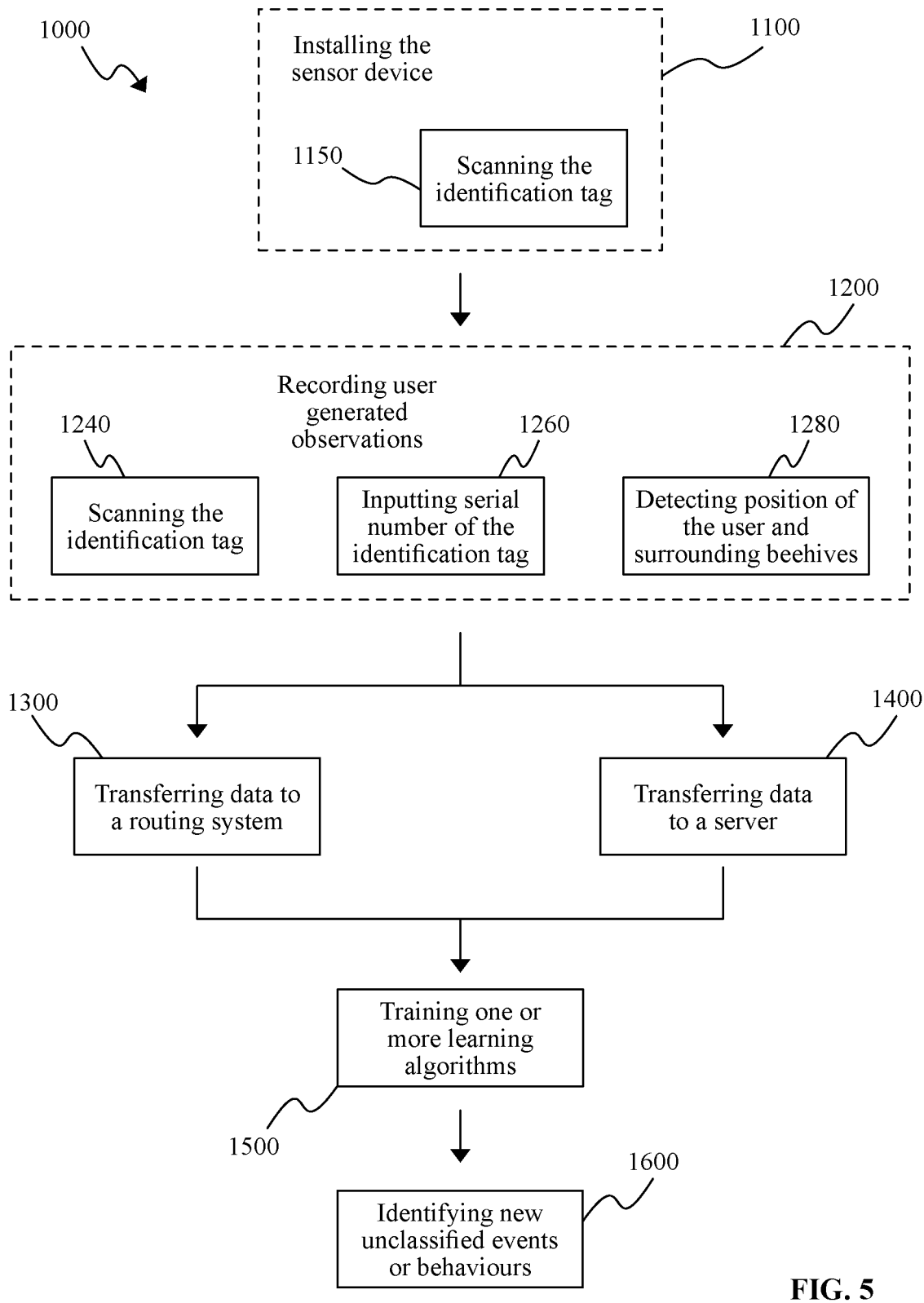
FIG. 5 is a workflow diagram of a method for monitoring health factors of one or more beehives using machine learning classification in accordance with the principles of the present invention.

The present invention also provides a method 1000 for training an artificial intelligence machine learning algorithm to classify beehive health states using sensor data alone. Referring now to FIG. 5, the method 1000 comprises a step of installing sensor devices 1100 into beehives for the collection of various properties of the beehives related to their wellbeing. The installation of the sensor devices may additionally comprise scanning an identification tag 1150 of the beehive.

The method further comprises recording user generated observations 1200 into one or more mobile devices. The recording of the user generated observations may additionally comprise scanning an identification tag 1240 of the beehive or inputting a serial number 1260 of the identification tag. In yet other embodiments, the method may comprise detecting the position of the user and detecting surrounding beehives 1280 or group of beehives. The recording of observational data is thus associated to the detected surrounding beehives or group of beehives.

The method 1000 may further comprise transferring the data from the sensor devices and mobile devices to a routing system 1300. The method may additionally comprise transferring the data from the sensor devices and mobile devices to a server 1400.

In some embodiments, the method may further comprise the step of training one or more machine learning algorithms 1500 to classify the health states of the beehives 50 using only data generated by the sensor devices.

In yet other embodiments, the method may comprise identifying new unclassified events or behaviors 1600 within a beehive or a group of beehives using the observational data and training the one or more machine learning algorithms with the time associated data captured from the sensor device.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for remote monitoring a health state of beehives, the system comprising:
   an identification tag associated with one of the beehives;
   a computerized device configured to:
      receive and store a measured property data paired to the identification tag;
      identify the health state of the beehives based on the received property data;
   a mobile computerized device of a user in data communication with the computerized device, the mobile computerized device being configured to:
      associate the mobile computerized device with the identification tag of one of the beehives to monitored;
      pair the measured property data with the identification tag;
      store human collected observational data in relation with the surrounding beehives, the human collected observational data being associated with at least one of the identified beehives associated with the identification tag:
   a machine learning training module to classify the health states of the beehives using the measured properties for the one or more beehives, the machine learning training module being configured to:
      calculate estimates based on the paired data;
      validate the calculated estimates using the human collected observational data inputted; and
      identify the health state of the beehive based on the received paired data and on the validated estimates.

2. The system of claim 1 further comprising a sensor device in data communication with the computerized device within a predetermined radius of the beehive, the sensor device being configured to:
   measure properties data within the beehive associated with the identification tag; and
   automatically pair the measured property data with the identification tag.

3. The system of claim 2, wherein the sensor device comprises an antenna having a reach of at least 50 meters in wireless communication with the computerized device.

4. The system of claim 3, wherein the long reach antenna operates at frequencies under 1 GHz.

5. The system of claim 2, wherein the sensor device comprises a scanning module configured to scan the identification tag.

6. The system of claim 5, wherein the sensor comprises a geolocalization module, the sensor device being configured to activate the scanning module when the geolocalization module detects a change of position of the sensor device.

7. The system of claim 5, wherein the sensor comprises an accelerometer, the sensor being configured to activate the scanning module when the accelerometer detects a movement of the sensor device.

8. The system of claim 2, wherein the sensor device is further configured to automatically re-pair with another identification tag when the sensor device is repositioned within a predetermined radius of another beehive.

9. The system of claim 2 further comprising a routing system being in wireless communication with the sensor device, the routing system comprising a storage medium configured to store at least one of the measured property data and the human collected observational data.

10. The system of claim 9, wherein the routing system is configured to process the measured property data by performing one of compressing, aggregating, and filtering on said measured property data.

11. The system of claim 2, the mobile device being configured to associate the sensor device to the identification tag.

12. The system of claim 1, wherein the identification tag comprises at least one of an NFC tag, a QR Code and a serial number.

13. The system of claim 1, wherein the measured property data is associated to a timestamp.

14. The system of claim 1, the mobile computerized device comprising a geolocalization module for detecting a position of the mobile computerized device, the mobile computerized device being configured to identify surrounding beehives based on the detected position.

15. A method for remotely monitoring a health state of beehives, each beehive being associated to an identification tag, the method comprising:
   a mobile device recording human collected observational data related to wellbeing of at least one of the identified beehives;
   the user associating the human collected observational data to the identification tag associated to the related beehive;
   pairing human collected observational data to the identification tag;
   transferring and recording the paired data to a remote computerized device;
   calculating estimates based on the paired data;
   the human collected observational data inputted by the user being used to validate the calculated estimates; and
   identifying the health state of the beehive based on the received paired data and on the validated estimates.

16. The method of claim 15, the method further comprising training machine learning algorithms to classify the beehive health states using the paired data.

17. The method of claim 16, using the trained machine learning algorithms to identify health state of the beehive.

18. The method of claim 15, the method further comprising identifying if calculated estimates are valid or invalid.

19. The method of claim 15 further comprising detecting a position of a mobile device of a user and identifying surrounding beehives based on the detected position.

20. The method of claim 15 further comprising:
associating a sensor device to an identification tag associated one of the beehives, the sensor device being within a close range of the beehive;
capturing data related to the health state of the beehive using the sensor device.

21. The method of claim 20 further comprising:
detecting a geolocalization position of the sensor device;
pairing the geolocalization position of the sensor device to captured data of the beehive.

22. The method of claim 20, the method further comprising routing the captured data to the computerized device through an intermediate system in data communication with the sensor device and within a predetermined radius of the sensor device.

23. The method of claim 20 further comprising scanning the identification tag using the mobile device.

24. The method of claim 20, wherein associating the sensor data with the identification tag further comprises detecting a displacement of the sensor.

25. The method of claim 20, wherein associating the sensor data with the identification tag further comprises detecting movement of the sensor.

26. The method of claim 20 further comprising associating timestamps to the captured data.

27. The method of claim 15 further comprising the precision beekeeping platform 10 may be further configured to complement the data retrieved by the sensor devices 200 with data provided by one or more external data sources.

28. A method for training an artificial intelligence machine learning algorithm to classify health states of beehives, the method comprising:
capturing and recording various properties relating to wellbeing of the beehives using sensor devices;
associating the captured properties with a unique identifier of one or more of the beehives and with a timestamp;
recording human collected observational data relating to the one or more beehives into one or more mobile devices;
associating the human collected observational data with the unique identifier of the one or more beehives and with a timestamp;
training the machine learning algorithms to classify the health states of the beehives using the various properties captured by the sensor devices and the human collected observational data for the one or more beehives, the training of the machine learning algorithms comprising calculating estimates based on the paired data and the human collected observational data inputted by the user being used to validate the calculated estimates.

29. The method of claim 28, the method further comprising identifying unclassified events or behaviors within one or more beehives using the human collected observational data and training the machine learning algorithms using the new unclassified events and the time associated properties captured by the sensor device.

30. The method of claim 28, the recording of the human collected observational data comprising scanning an identification tag of the beehive or inputting an identification number of the identification tag into the mobile device.

31. The method of claim 28, the method further comprising:
detecting a position of the mobile device;
automatically identifying surrounding beehives based on the detected position;
associating the inputted human collected observational data to the identified surrounding beehives.

* * * * *